July 22, 1969     G. A. TIBY     3,456,659
APPARATUS FOR TREATING FOOD ARTICLES
Filed Jan. 11, 1966
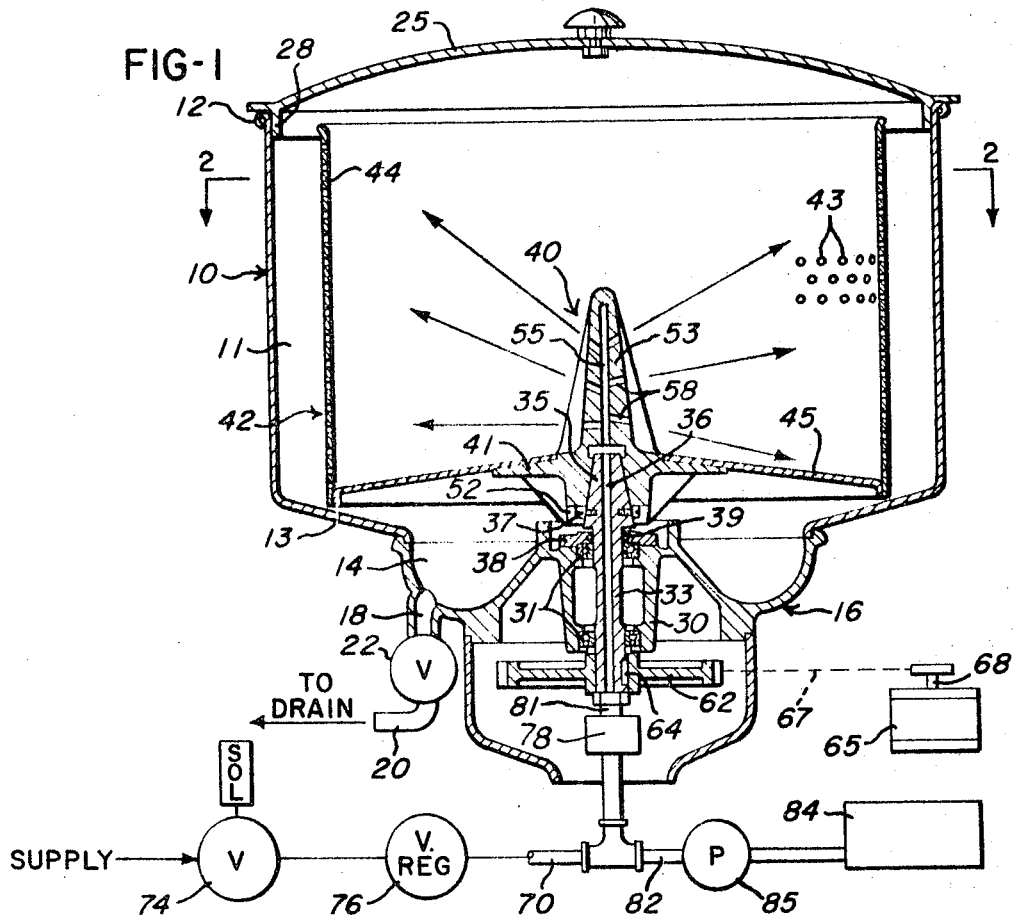
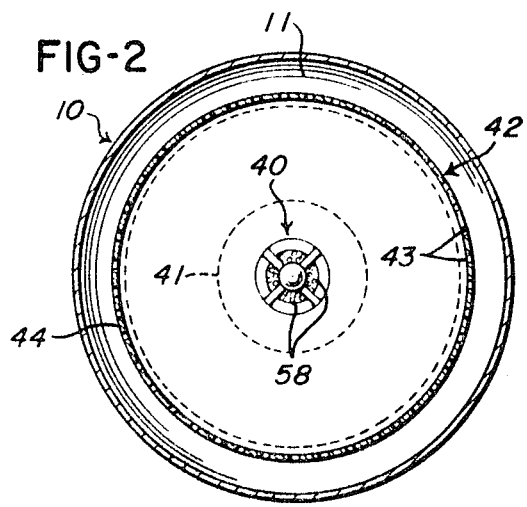
INVENTOR.
GÉRARD TIBY
BY
Marechal, Biebel, French & Bugg
ATTORNEYS United States Patent Office 3,456,659
Patented July 22, 1969

3,456,659
APPARATUS FOR TREATING FOOD ARTICLES
Gerard A. Tiby, Ivry-sur-Seine, France, assignor to
The Hobart Manufacturing Company, Troy, Ohio,
a corporation of Ohio
Filed Jan. 11, 1966, Ser. No. 519,859
Int. Cl. B08b 3/06, 3/02
U.S. Cl. 134—153                                    4 Claims

ABSTRACT OF THE DISCLOSURE

Food products or articles are placed within a perforated basket having a centrally located nozzle member, and the basket is placed within a chamber where the nozzle member seats on the upper end of the vertical spindle having a passageway for conducting water to discharge openings within the nozzle member. The basket is rotated at one speed while water is sprayed onto the food articles for washing the articles and at a higher speed after the water is shut off to provide for centrifugally drying the articles.

---

This invention relates to a process and apparatus for treating various food articles, and more particularly, to a process and apparatus which is primarily adapted for cleaning and drying various fruit and vegetable articles but may be also used for other treatments such as bleaching or soaking of the articles.

The apparatus of the present invention is particularly adapted for use in a food market or commerical restaurant where it is desirable to clean and dry large quantities of food articles prior to displaying or preparing them for serving to customers. For example, in making vegetable salads, it is desirable to first wash or clean the vegetables with fresh water or a water cleaning solution to remove dirt and other foreign particles, and then dry the vegetables by removing substantially all of the water from the surface of the articles. However, since some food articles are relatively fragile or soft and easily bruised, such as fresh lettuce leaves, tomatoes, and grapes while others are considerably less fragile and harder such as potatoes, carrots and apples, it is desirable that the apparatus be adapted to clean and dry at variolus intensities according to the fragileness or softness of the particular food article.

Accordingly, it is a primary object of the present invention to provide a novel apparatus for quickly cleaning and drying large quantities of food articles and which is adapted to handle batches of practically any food article regardless of its fragileness or softness.

It is also an object of the invention to provide a novel process for cleaning and drying a wide variety of food articles whereby fresh cleaning water is caused to flow around the entire surface of each article and drain therefrom due to centrifugal action so that the quantity of fresh water required for cleaning the articles is minimized.

Another object of the present invention is to provide a novel apparatus as outlined above which is adapted to clean the food articles by a controlled spray of cleaning water and then dry the articles by centrifugally removing the water from the surfaces of the articles.

As a somewhat more specific object, the invention provides a novel apparatus for cleaning batches of food articles, including a perforated basket rotatably mounted on a vertical axis and means for rotating the basket at a predetermined speed while introducing cleaning water into the center portion of the basket so that the entire outer surface of each food article is cleaned by an outwardly flow of water around its surface, and wherein the articles are dried by rotating the basket at a somewhat faster speed after the water is shut off to drain the water centrifugally from the articles.

A further object of the invention is to provide a novel apparatus as outlined above wherein the pressure of the cleaning water introduced within the center of the basket is controlled along with the rotational speed of the basket according to density and the fragileness or softness of the particular article being cleaned.

Still another object of the invention is to provide an apparatus as outlined above wherein the basket is easily removable so that it may be used for conveniently carrying and transporting the food articles to and from the apparatus.

It is also an object of the invention to provide a cleaning apparatus as outlined above including a system for injecting a treating agent, such as a bleach, detergent, or preservative into the water for treating the food articles.

Other objects and advantages of the invention will be apparent from the following description, the accompanying drawing and the appended claims.

In the drawing:

FIG. 1 is an elevational view in axial section of an apparatus constructed in accordance with the invention; and FIG. 2 is a section view of the apparatus shown in FIG. 1 as seen along the line 2—2.

Referring to the drawing which illustrates a preferred embodiment of the present invention, the apparatus generally includes a cylindrical tank 10 which defines a treating or cleaning chamber 11 and is formed having an upper rolled edge 12. The tank is provided with an annular sloping bottom wall 13 which drains into an annular shaped sump 14 defined by a bottom housing 16. A drain outlet 18 connects the bottom of the sump 14 to a suitable drain line 20 through a drain valve 22. Mounted on top of the tank 10 is a closure member or cover 25 which rests upon the top rolled edge 12 and includes a cylindrical flange 28 which extends partly down into the tank 10 to provide a suitable water tight seal. The cover 25 may be hinged to the tank 10 or may be completely removed, as desired, and primarily serves to prevent splashing and reduce the outside noise level of the cleaning operation within the tank 10.

Integrally formed as a portion of the bottom housing 16 is a hub 30 which extends downwardly from the center of the housing. Rotatably supported within the hub 30 by a pair of bearings 31 is a tubular spindle 33 which is positioned with a vertical axis of rotation and includes a frusto-conical shaped or tapered upper end portion 35. The spindle 33 defines an axially extending passageway 36 and threaded radially into the tapered portion 35 are a pair of diametrically positioned radially extending screws 37. Surrounding the spindle 33 and covering the upper bearing 31 is an annular plate 38 which retains a sealing ring 39 for providing a water tight seal between the housing 16 and the rotatable spindle 33.

Mounted on the tapered end portion 35 of the spindle 33 within the chamber 11 is a hub member 40 having an annular flange portion 41. This hub member forms a part of a cylindrically shaped basket 42 having a series of openings or perforations 43 formed within its cylindrical wall 44 and including a slightly conical-shaped bottom member 45 which is secured to the top of the flange portion 41 to provide for complete gravity draining of the basket 42 through the bottom perforations.

Formed within the lower end portion of the hub member 40 are a pair of diametrically spaced axially extending slots 52 which receive the heads of the screws 37 to provide a positive driving connection with the spindle 33. By this mounting arrangement, it can be seen that the basket 42 may be easily removed from the chamber 11 simply by lifting the basket so that the hub member 40 lifts off of the tapered portion 35 of the spindle 33. The removability of the basket 42 has been found desirable to enable the basket to be also used as a carrier for transporting the articles and to provide for convenient loading and unloading.

The upwardly projecting portion 53 of the hub member 40 is provided with an axially extending passageway 55 which is in fluid communication with the axially extending passageway 36 formed within the tubular spindle 33. Also formed within the hub portion 53 are a series of radially spaced nozzle openings 58 which are formed to spray jets or streams of cleaning water outwardly towards the cylindrical wall 44 at various angle in relation to the axis of erally cover the inner surfaces of all the food articles erally cover the inner surfaces of all the food articles placed within the basket 42.

Mounted on the bottom end portion of the spindle 33, adjacent the lower bearing 31 is a drive pulley 62 which is secured for positive rotation with the spindle 33 by a key 64. The basket 42 including the hub member 40 are rotated by a motor 65 which is connected to the pulley 62 through a suitable belt drive system 67. Preferably, the motor 65 has a variable speed output shaft 68 for rotating the basket 42 at various different speeds. However, it is to be understood that the various speeds may be obtained by other means such as providing variable speed belt drive means 67.

Water is supplied to the nozzle outlets 58 from a suitable water supply line 70 in which is connected a solenoid operated control valve 74, a pressure regulating valve 76 and a fluid tight rotary gland or coupling 78 which has a rotary output conduit 81 connected to the bottom end of the tubular spindle 33. The water pressure within the line 70 and thus the force exerted by the jets of water discharged from the nozzle outlets 58 may be controlled according to the fragileness or softness of the food products being cleaned by adjusting the pressure regulating valve 76.

Also connected to the water supply line 70 is a fluid injection line 82 which leads from a suitable storage container 84 through an injection pump 85. The pump 85 is adapted to develop an output pressure which is somewhat higher than the pressure of the water within the supply line 70 following the regulating valve 76 so that a liquid treating agent stored within the container 84 may be injected into the supply water, as for example, when it is desirable to add a liquid bleach or color preservative to the supply water for treating particular food articles.

In operation, a batch of food articles, as for example, several bunches of carrots, are placed within the perforated basket 42. The basket is then rotated slowly by the variable speed motor 65 while cleaning water is simultaneously sprayed in jets from the nozzle outlets 58 so that the outwardly directed jets of water cooperate with the centrifugal action provided by the rotating basket to cause the water to flow around each carrot and flush the adhering dirt and other foreign particles from the surface of the carrots and through the perforations 43.

With some food articles, it may be desirable to soak the articles, as for example, to add a color preservative to french fry potato strips. To accomplish this, the valve 22 connected to the drain outlet 18 is closed which enables the tank 10 to be filled with a water solution containing a color preservative. The basket 42 may then be slowly rotated to assure that the potato strips are thoroughly soaked and impregnated with preservative.

After the food articles have been thoroughly cleaned by the jets of cleaning water discharged through the nozzle outlets 58, the control valve 74 is closed which stops the flow of water through the nozzle outlets 58 and allows the tank 10 to be drained. Then, preferably, the speed of the motors 65 is increased thereby increasing the rotational speed of the basket 42 which causes the water to be extracted from the basket 42 and drained from the food articles by centrifugal action. After this drying operation, the basket 42 may be lifted from the chamber 11 and used for carrying the food articles to another station for further processing.

From the drawings and the above description it can be seen that an apparatus formed in accordance with the present invention provides several desirable features and advantages. Specifically, the apparatus provides an efficient and effective method for cleaning large volumes of food articles such as fruits or vegetables with a minimum use of fresh water. Not only does the apparatus effectively clean the articles by the natural centrifugal flow of cleaning water around each article, in addition, the speed of the basket 42 can be substantially increased to provide for effective drying or draining of water from the food articles.

An additional feature is provided by the pressure regulation valve 76 which controls the impact of the jets of water discharged from the nozzle outlets 58 onto the food articles according to the fragileness or softness of the particular article being treated. Thus the apparatus may be adjusted to provide an effective washing, rinsing and drying of practically any food article without danger of bruising or otherwise damaging the article. Furthermore, the rotational speed of the basket 42 can be controlled so that slow rotation can be employed for cleaning relatively soft or fragile food articles and a faster rotation for cleaning harder and less fragile articles. Also, this control of the rotational speed of the basket can be employed to prevent undesirable vibrations of the apparatus in case rather dense food articles are not uniformly distributed within the basket 42.

While the form of apparatus herin described constitutes a perferred embodiment of the invention, it is to be understood that the invention is not limited to this precise form of apparatus, and that changes may be made therein without departing from the scope of the invention which is defined in the appended claims.

What is claimed is:

1. Apparatus for quickly cleaning and drying batches of food articles, comprising a tank defining a chamber accessible from the top, a generally vertical spindle rotatably supported within the central portion of said tank and including means defining an axially extending water supply passageway therein, a conduit connected to said spindle for supplying water to said passageway, a substantially rigid basket positioned within said chamber and including a bottom wall supporting a perforated side wall, a nozzle member mounted on said bottom wall within the central portion of said basket and having means defining a plurality of nozzle openings, means for mounting said basket on said spindle to provide for convenient removal of said basket from said spindle and said chamber, said mounting means forming a substantially water tight connection between said nozzle openings and said passageway within said spindle to provide for directing jets of cleaning water outwardly against the articles placed within said basket, means defining a drain outlet for said tank, and a drive for rotating said spindle and said basket while cleaning water is sprayed from said nozzles to provide an outward flow of cleaning water around the articles and through said side wall of said basket and to dry the articles after the spray of water is shut off.

2. Apparatus as defined in claim 1 wherein said mountting means comprises tapered mating surfaces on the lower end of said nozzle member and the upper end of said spindle.

3. Apparatus as defined in claim 1 wherein said drive includes means for rotating said basket at one speed while cleaning water is sprayed onto the articles and for rotating said basket at a higher speed for centrifugally drying the articles after the water is shut off.

4. Apparatus as defined in claim 1 including a solenoid actuated valve and a pressure regulating valve in said conduit for controlling the flow and pressure of the cleaning water supplied to said nozzle openings.

References Cited

UNITED STATES PATENTS

| | | | |
|---|---|---|---|
| 2,893,410 | 7/1959 | Frekko | 134—144 |
| 3,216,429 | 11/1965 | Dick | 134—167 |
| 2,515,702 | 7/1950 | Douglass. | |

MORRIS O. WOLK, Primary Examiner

J. D. OLSEN, Assistant Examiner

U.S. Cl. X.R.

68—23; 134—33, 148, 155; 261—88

PO-1050
(5/69)

UNITED STATES PATENT OFFICE
CERTIFICATE OF CORRECTION

Patent No. 3,456,659            Dated July 22, 1969

Inventor(s) Gerard Tiby

It is certified that error appears in the above-identified patent and that said Letters Patent are hereby corrected as shown below:

Column 3, line 26, cancel "erally" through the end of the paragraph and insert --rotation of the basket 42. The nozzle openings 58 are preferably spaced uniformly around the periphery of the upper hub portion 53 so that the jets of water will generally cover the inner surfaces of all the food articles placed within the basket 42.--.

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents